United States Patent

[11] 3,609,560

[72] Inventor Michael P. Greenberg
Winchester, Mass.
[21] Appl. No. 1,808
[22] Filed Jan. 9, 1970
[45] Patented Sept. 28, 1971
[73] Assignee Bedford Associates, Inc.
Bedford, Mass.

[54] DATA SEPARATION CIRCUIT FOR MAGNETIC RECORDER MEMORIES
15 Claims, 6 Drawing Figs.

[52] U.S. Cl. .......... 328/63, 178/69.5 R, 307/233, 307/269, 328/119, 328/139, 328/155, 340/174.1 A
[51] Int. Cl. .......... H03k 1/00, H03k 3/04
[50] Field of Search .......... 328/63, 72, 74, 119, 139, 155; 307/208, 232, 233, 269; 178/69.5 R; 340/174.1 A, 174.1 H

[56] References Cited
UNITED STATES PATENTS

| | | | |
|---|---|---|---|
| 3,390,284 | 6/1968 | Carothers et al. | 307/269 |
| 3,401,346 | 9/1968 | Brown et al. | 307/269 X |
| 3,491,303 | 1/1970 | Gindi | 328/119 X |
| 3,510,786 | 5/1970 | Paulson | 328/63 X |

*Primary Examiner*—Stanley D. Miller, Jr.
*Attorney*—Mattern, Ware and Davis

ABSTRACT: A data separation circuit providing an output separation gate signal having a frequency proportional to the average frequency of the input clock pulse signals that are recorded on a magnetic rotating memory disc. The clock pulse signals are then readily separated from data pulse signals in the recorded signal even though the exact position in time of each pulse has been altered by the recording process. The data separation circuit comprises simple, easily assembled circuitry that tracks recording frequencies read from two types of magnetic rotating memory drives, one of which records at twice the frequency of the other. A major component of the data separation circuit is a frequency controllable oscillator that simultaneously produces a sawtooth wave and a clock pulse. The oscillator clock pulse rate is compared with the input recorded clock pulse rate and the comparator output is used to control the oscillator's frequency rate.

The separation gate signal is initiated and terminated when the frequency controlled sawtooth wave attains predetermined levels. Similarly, the attainment of a predetermined level by the sawtooth wave is used in generating the feedback signal to the oscillator when operating with a high frequency memory drive. Expensive and complicated high frequency pulse logic circuits are therefore not required.

INVENTOR
MICHAEL P. GREENBERG

BY

*MATTERN WARE & DAVIS*
ATTORNEYS

DATA SEPARATION CIRCUIT FOR MAGNETIC RECORDER MEMORIES

SUMMARY OF THE INVENTION

The present invention relates to a data separation circuit for magnetic recorder memories. Such circuits are used for tracking varying recording frequencies read from a magnetic rotating memory and for creating a separation gate from which data pulses can be separated from clock pulses.

When a signal combining both data and clock signals is recorded on a magnetic memory disc, the combined signal is subject to timing errors, and some difficulty is encountered in separating the data signals from the clock signals upon playback. The combined data and clock signal that is supplied to present day commercial magnetic rotating memory discs are composed of bit cells. Each bit cell contains a clock pulse and may or may not contain a data pulse, depending on the value of the recorded bit. The recording process is such that these pulses are converted into flux reversals and then recovered by peak detection. Due to this recording process, the exact position of each pulse will have shifted in a manner dependent upon the nature of the recorded signal. Due to the high recording density and the variations in speed of the discs or drum, the output wave form cannot be used to simply pickoff the pulses and determine whether they are data or clock.

Prior art data separation circuits used to separate the data from the clock pulses are complex, expensive and somewhat unreliable. Different circuits are usually designed and used in association with the two data rates presently employed in the ubiquitous disc computer memories. The circuitry employed for use with the memories generating at the higher data rate are particularly complex and expensive, as they employ high frequency pulse logic circuits.

OBJECTS OF THE INVENTION

It is therefore an object of the present invention to provide a data separation circuit for magnetic recorder memories.

Another object of the invention is to provide a data separation circuit of the above character capable of tracking the time-varying clock and data signals reproduced by such memories.

A further object of the invention is to provide a data separation circuit of the above character not employing high frequency pulse logic circuits.

Still another object of the invention is to provide a data separation circuit of the above character for use with two types of memory drives, one of which operates at twice the pulse rate of the other.

A further object of the invention is to provide a data separation circuit of the above character that is relatively simple, inexpensive and reliable.

Other objects of the invention in part be obvious and will in part appear hereinafter.

The invention accordingly comprises the features of construction, combination of elements and arrangement of parts which will be exemplified in the construction hereinafter set forth. The scope of the invention is indicated in the claims.

THE DRAWINGS

For a fuller understanding of the nature and objects of the invention, reference should be had to the following detailed description taken in connection with the accompanying drawings, in which.

Figure 1:
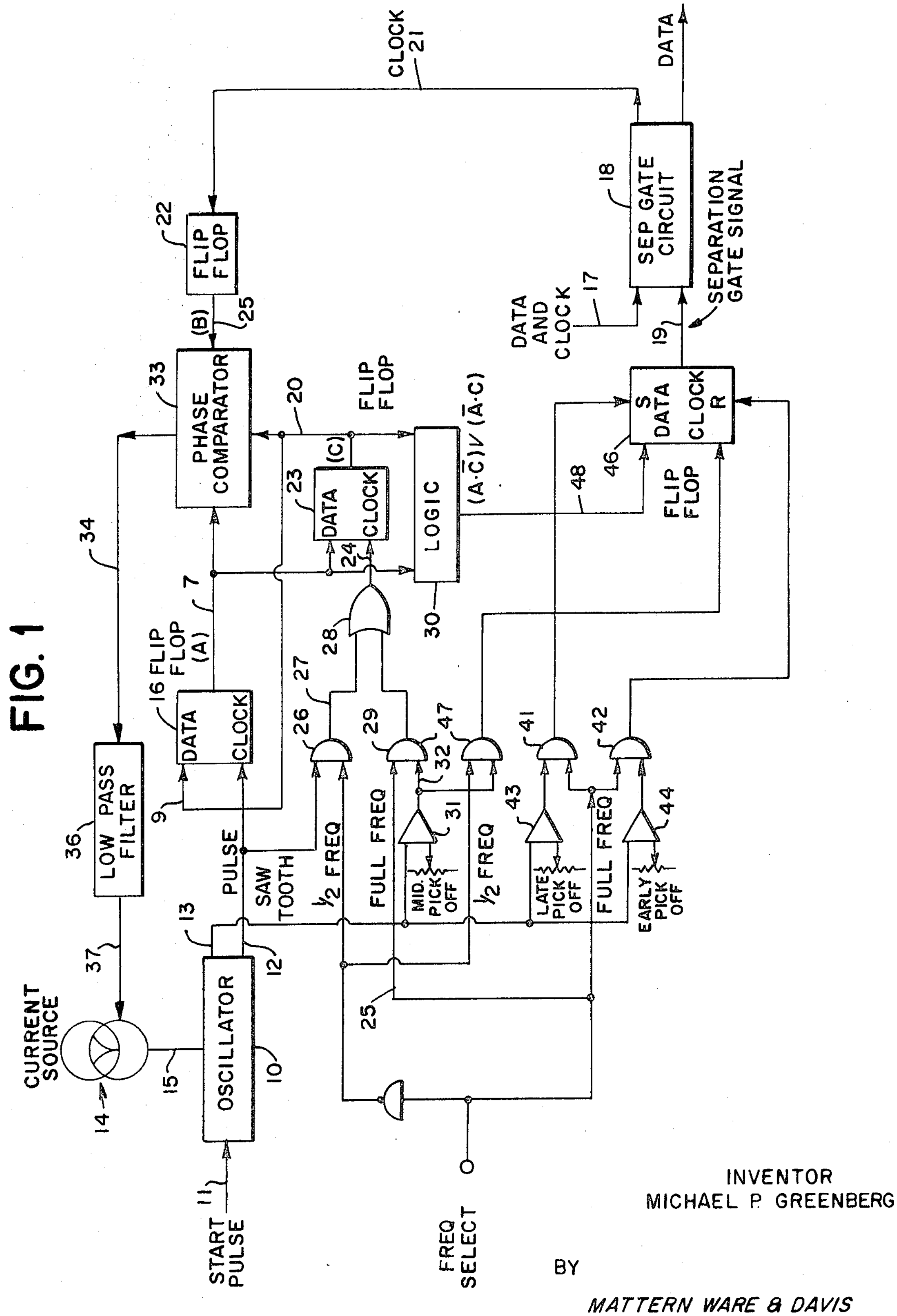
FIG. 1 is a logic block diagram of a data separation circuit according to the present invention.
Figure 4A:
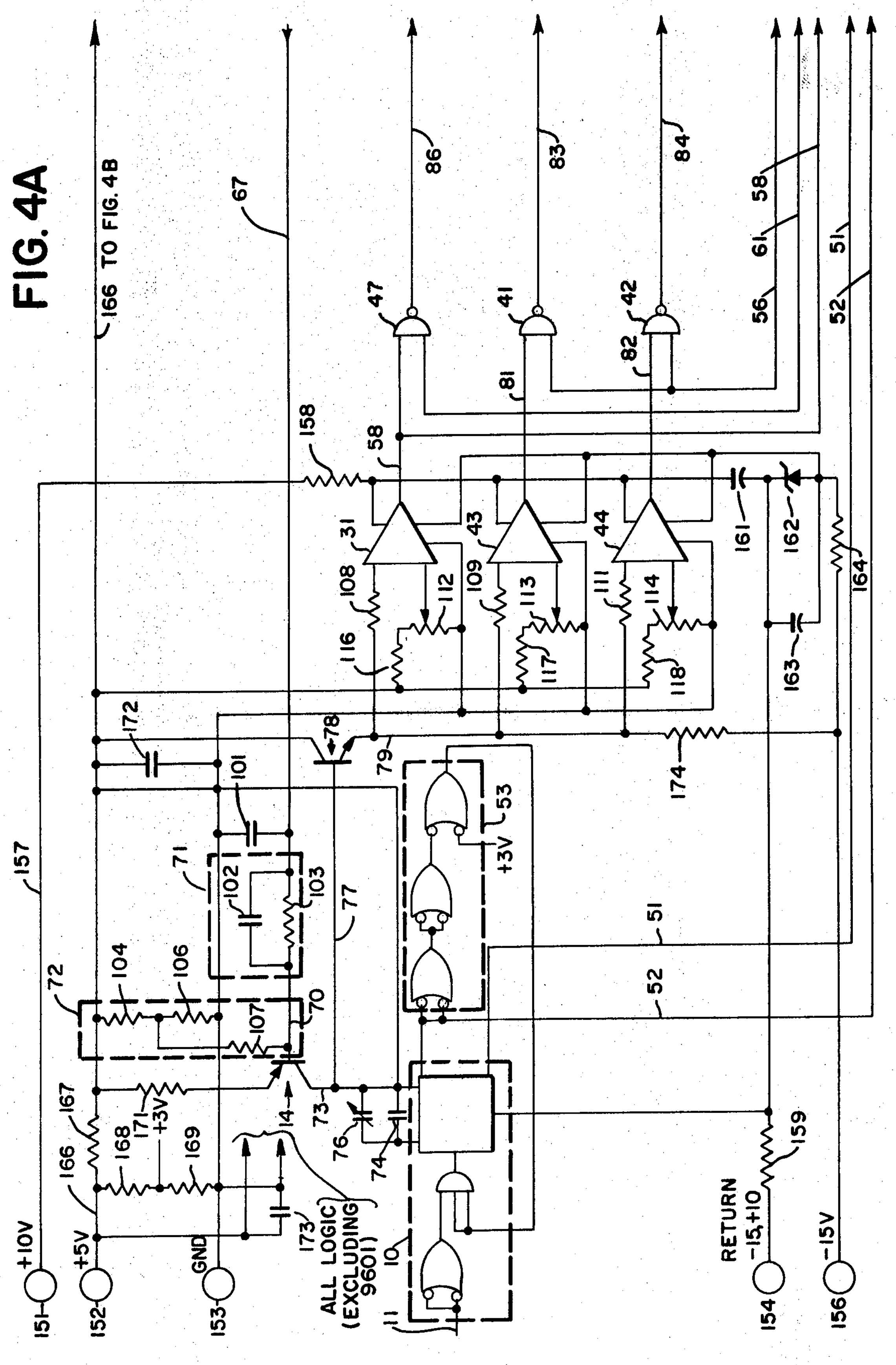
Figures 4B, 4C:
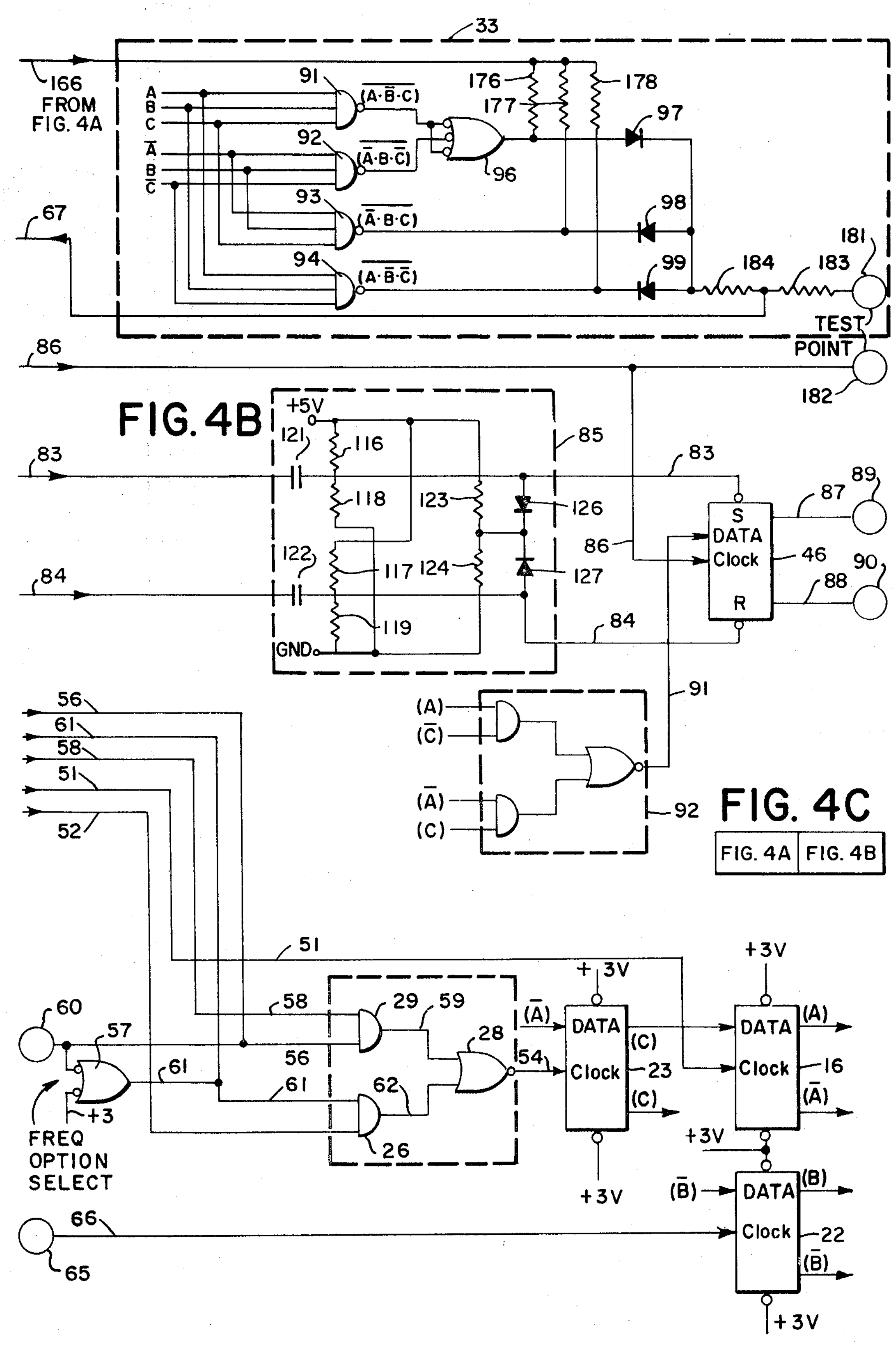

FIG. 4 comprising FIGS. 4A and 4B is a detailed electrical circuit diagram of the data separation circuit of FIG. 1; and, FIG. 4C is a diagram showing how FIGS. 4A and 4B may be fit together to form FIG. 4.

The same reference characters refer to the same elements throughout the several views of the drawings.

SPECIFIC DESCRIPTION

A major component of the data separation circuit of the invention is a frequency controllable oscillator that repetitively produces a sawtooth wave and a clock pulse simultaneously. The oscillator clock pulses are compared with the recorded clock pulses, and the comparator output is used to control the oscillator's frequency rate. The oscillator's frequency controlled sawtooth wave is used to generate the separation gate signal by using attainment of predetermined levels of the sawtooth wave.

By using a frequency controllable oscillator as the basis for generation of the desired separation gate signal, simplicity in the circuitry is achieved with the resulting added reliability and lower cost. The existing circuitry designed to generate a separation gate signal employ complex, high frequency pulse logic circuitry for each mode of operation. This invention accomplishes a dual mode of operation by using a frequency-controllable oscillator-based circuit.

This data separation circuit of the invention is capable of use with the commercial types of magnetic rotating memory drives, the pulse rate of one of which is twice as fast as the other. The frequency option is selected by a single potential level.

Now referring to FIG. 1, a frequency controllable oscillator 10 is put into an operating mode by supplying a start pulse on line 11. Oscillator 10 simultaneously produces a clock pulse on line 12 and sawtooth pulse on line 13. The output frequency of oscillator 10 is controlled by a controlled current source 14, which provides charging current on line 15 to a timing capacitor (not shown) within oscillator 10. When the frequency of oscillation changes, the slope of the sawtooth pulse on line 13 will also change.

The rising edge of the clock pulse on line 12 causes flip-flop 16 to sample the level on its data input pin 9 and produce a corresponding output level (A) on line 7 if and only if flip-flop 16 has received an input signal at its data input pin 9.

The combined data and clock signal received on line 17 from the memory after recording is supplied as an input to a separation gate circuit 18. In response to a proper separation gate signal on line 19, the separation gate circuit 18 (which is known in the prior art) separates clock pulses from data pulses in the combined signal on line 17, using the leading edge of each pulse on line 17 to sample the separation gate signal, thereby triggering a pulse circuit to produce the separated data or clock pulse. The resultant clock pulses on line 21 drive flip-flop 22 to produce a state indicating output signal level (B) on line 25.

A flip-flop 23 is connected at its input data pin to line 7 and at its clock input pin to line 24. A state indicating output signal level (C) is produced by flip-flop 23, when flip-flop 23 is receiving level (A) on line 7 and is initiated by a pulse signal on line 24. The pulse signal on line 24 causes flip-flop 23 to sample the level on its data input pin and produce the corresponding output signal level (C). When the half frequency mode is selected, an AND gate 26 is enabled and produces a signal on line 27 in response to the receipt of an oscillator pulse signal on line 12. This signal on line 27 is supplied to one input of OR gate 28, and thus on line 24 to flip-flop 23. When operating in the half frequency mode, the pulse signal on line 24 is identical to the oscillator pulse signal on line 12 since AND gate 26 and OR GATE 28 merely transmit the pulse signal through them.

When the data separation circuit is operating at full frequency, AND gate 26 is not enabled, and the oscillator pulse signal on line 12 will not be transmitted. Instead, an AND gate 29 is enabled and transmits a signal produced by a pickoff comparator 31. Pickoff comparator 31 is connected to initiate this midpickoff signal on line 32 when the sawtooth signal on line 13 passes through the midpoint of its rising level. AND gate 29 is enabled by a frequency mode selection on line 25. The midpickoff signal on line 32 is transmitted through AND-gate 29, through OR gate 28 and causes flip-flop 23 to produce state indicating output signal (C) on line 20 if, and only if flip-flop 16 is in state (A). State indicating output signal (A) is produced when flip-flop 16 is enabled by the pulse signal on line 12, if and only if flip-flop 23 is in state (C).

Phase comparator 33 is connected to receive signals (A), (B) and (C) as inputs and produces an output signal on line 34. This output signal on line 34 is supplied to a low-pass filter 36 which produces a direct current signal on line 37 that is used to control current source 14.

When the data separation circuit is operating in the full frequency mode, AND-gates 41 and 42 are enabled and transmit the signals produced by pickoff comparators 43 and 44, respectively. Pickoff comparator 43 initiates an output signal when sawtooth wave on line 13 passes through a predetermined level during the late stages of the rising sawtooth level and pickoff comparator 44 initiates an output signal when the sawtooth wave on line 13 passes through a predetermined level during the early stages of the rising sawtooth level.

A flip-flop 46 is connected to respond as either a set-reset flip-flop or a pulse-triggered flip-flop. When the data separation circuit is operating in the full frequency mode, an AND-gate 47 is not enabled, and, therefore, no signal is supplied to the triggering clock input pin of flip-flop 46. This allows flip-flop 46 to perform as a set-reset flip-flop. When the data separation circuit is operating in the half frequency mode, AND-gate 47 is enabled, but AND-gates 41 and 42 are not enabled. Consequently, flip-flop 46 does not receive set or reset signals and flip-flop 46 performs as a pulse-triggered flip-flop.

When operating in the full frequency mode—flip-flop 46 performing as a set-reset flip-flop—the output signal from pickoff comparator 43 is transmitted through AND-gate 41 to the set input pin of flip-flop 46 and will set the same. Similarly, in the full frequency mode, the output signal from pickoff comparator 44 is transmitted through enabled AND gate 42 and resets flip-flop 46. The output of flip-flop 46 is the desired separation gate signal on line 19.

When the data separation circuit is operating in the half frequency mode, midpickoff output signal from pickoff comparator 31 is transmitted on line 32 through AND-gate 47 and causes flip-flop 46 to sample the level of the signal received at the data pin of flip-flop 46 on line 48 and produce a corresponding output signal on line 19. The signal on line 48 is produced by logic circuit 30 responsive to signals (A) and (C) to produce an output signal defined by the logic equation $(A\cdot\bar{C}) \vee (\bar{A}\cdot C)$, that is, the data signal exists on line 48 if signal (A) exists and not signal (C) or if signal (A) does not exist and signal (C) does exist.

Figure 2:
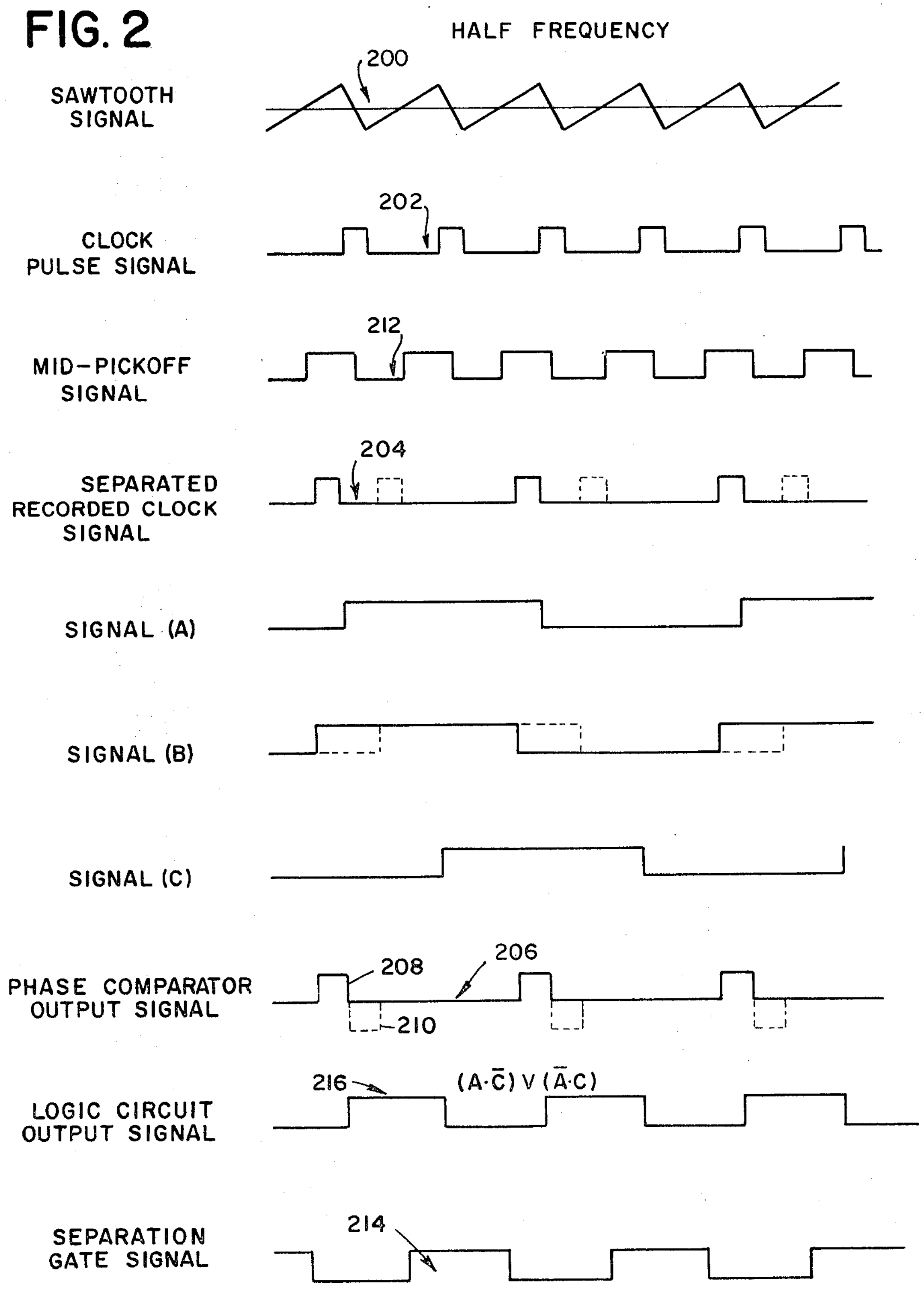
FIG. 2 is a timing diagram for the data separation circuit of FIG. 1 operating at one-half full frequency.

FIG. 2 is the timing diagram for the data separation circuit when operating in the half frequency mode. The sawtooth signal 200 and clock pulse signal 202 are simultaneously produced at the same repetition frequency. Since the data input pins of flip-flops 16 and 23 are connected to each other's outputs, and their clock inputs are connected to receive the oscillator clock pulses 202, they act as a divide-by-four counter having outputs (A) and (C) 90° out of phase.

The separated recorded clock signal 204 may be either leading (shown by solid line) or lagging (shown by dotted line) the oscillator clock pulse signal 202. Flip-flop 22 performs as a divide-by-two flip-flop in response to recorded clock signal 204 and produces output signal level (b).

The phase comparator output signal 206 is produced by logic circuits that are responsive to input signals (A), (B) and (C). The phase comparator 33 produces a signal 206 comprising positive pulses 208 when the recorded clock pulses 204 lead the oscillator clock pulses 202 and negative pulses 210 when the recorded clock pulses 204 lag the oscillator. These pulses are proportional in duration to the duration of the lead or the lag of the clock pulses 202. As further explained below, phase comparator 33 comprises only level responsive logic circuits for producing this output signal which is positive when the logical statement $(A\cdot\bar{B}\cdot C) \vee \bar{A}\cdot B\cdot\bar{C})$ is true and negative when the logical statement $(\bar{A}\cdot B\cdot C)\vee(A\cdot\bar{B}\cdot\bar{C})$ is true and zero at all other times.

Midpickoff signal 212 from pickoff pickoff comparator 31 is initiated from its extreme low level to its extreme high level when sawtooth signal 200 passes through the midpoint of the rising sawtooth level. Midpickoff signal 212 continues its extreme high level while sawtooth signal 200 is above the midpoint level, and is terminated from its extreme high level to its extreme low level when sawtooth signal 200 passes through the midpoint of the declining sawtooth level. Logic circuit 30 is responsive to input signals (A) and (C) to produce logic circuit output signal 216, which is positive when signal (A) is true and signal (C) is not true or when signal (A) is true and signal (A) is not true. Output signal 216 can be represented by the logical statement $(A\cdot\bar{C}) \vee (\bar{A}\cdot C)$ The desired separation gate signal 214 is the output of flip-flop 46. When in the half frequency mode, flip-flop 46 receives signal 216 at its data pin and is triggered to change its state by the leading edge of midpickoff signal 212 when signal 216 is present.

Figure 3:
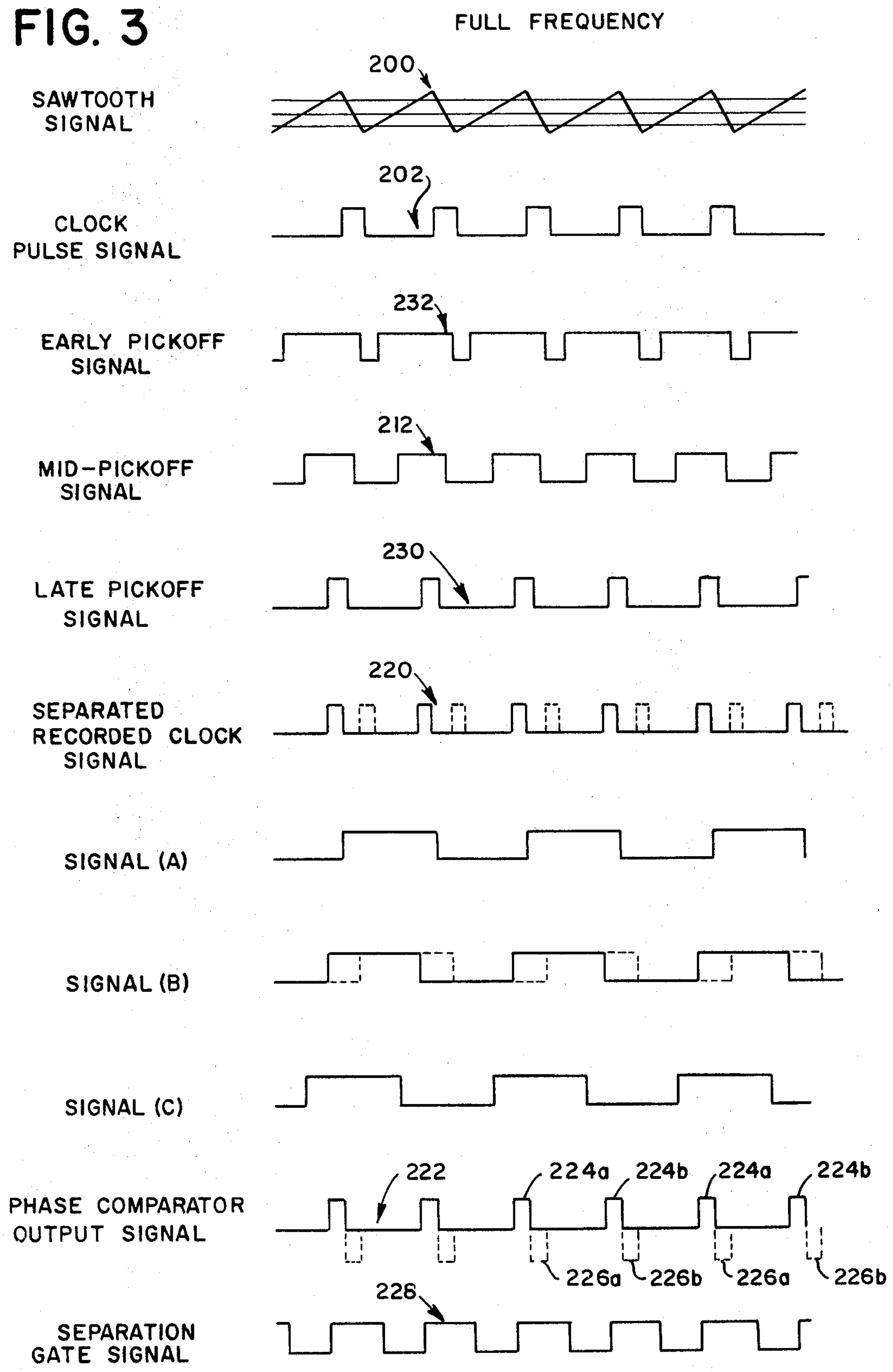
FIG. 3 is a timing diagram for the data separation circuit of FIG. 1 operating at full frequency.

FIG. 3 is the timing diagram for the data separation circuit when operating in the full frequency mode. Sawtooth signal 200 and pulse signal 202 are simultaneously produced at the same repetition frequency. Since the data input pins of flip-flops 16 and 23 are connected to each other's outputs, and the clock input of flip-flop 16 is connected to receive the oscillator clock pulses 202 while the clock input of flip-flop 23 is connected to receive midpickoff signal 212 from pickoff comparator 31, the flip-flops act as a divide by two shift counter producing outputs (A) and (C) 90° out of phase, depending on position of midpickoff signal 212.

The separated recorded clock signal 220 may be either leading (shown by solid line) or lagging (shown by dotted line) oscillator clock pulse signal 202. Flip-flop 22 is responsive to recorded clock signal 220 and performs as a divide by two flip-flop to produce output signal level (B).

As discussed earlier, phase comparator 33 comprises logic circuits that are responsive to signals (A), (B) and (C) to produce an output signal 222. Phase comparator 33 produces signal 222 comprising positive pulses 224 when the recorded clock pulses 220 lead the oscillator clock pulses 202 and negative pulses 226 when the recorded clock pulses 220 lag the oscillator clock pulses 202. These pulses are proportional in duration to the duration of lead of clock pulses 202. As further explained below, phase comparator 33 comprises only level responsive logic circuits for producing this output signal which is positive when the logical statement $(A\cdot\bar{B}\cdot C) \vee (\bar{A}\cdot B\cdot\bar{C})$ is true and negative when the logical statement $(\bar{A}\cdot B\cdot C) \vee (A\cdot\bar{B}\cdot\bar{C})$ is true and zero for all other times. As shown if FIG. 3, the logic circuits of phase comparator 33 are connected to be responsive to the leading edge of signal (B) to initiate positive pulses 224*a* and responsive to the leading edge of signal (A) to terminate positive pulses 224*a*, and further responsive to the trailing edge of signal (B) to initiate positive pulses 224*b* and responsive to the trailing edge of signal (A) to terminate positive pulses 224*b*, when signal (B) is leading signal (A). Furthermore, the logic circuits of phase comparator 33 are connected to be responsive to the leading edge of signal (A) to initiate negative pulses 226*a* and responsive to the leading edge of signal (B) to terminate negative pulses 226*a*, and further responsive to the trailing edge of signal (A) to initiate negative pulses 226 *b* and responsive to the trailing edge of signal (B) to terminate negative pulses 226*b*, when signal (B) is trailing signal (A).

When in the full frequency mode, the desired separation gate signal 228, which must be proportional to the separated recorded clock pulse signal 220, is generated by using two different levels on frequency controlled sawtooth signal 200. The late pickoff signal 230 from pickoff comparator 43 is initiated from its extreme low level to its extreme high level when sawtooth signal 200 passes through a predetermined point during the late portion of the rising sawtooth level and remains at that level while sawtooth signal 200 is above the late pickoff level.

Late pickoff signal 230 terminates from its extreme high level to its extreme low level when sawtooth signal 200 passes through the predetermined level during the declining sawtooth level. Similarly, early pickoff signal 232 is initiated from its extreme low level to its extreme high level when sawtooth signal 200 passes through a predetermined point during the early stages of the rising sawtooth level, is maintained at that level while sawtooth signal 200 is above the predetermined early pickoff level, and is terminated from its extreme high level to its extreme low level when sawtooth signal 200 passes through this level during the declining sawtooth level.

Flip-flop 46 performs as a set-reset flip-flop and is responsive to the leading edge of late pickoff signal 230 to set flip-flop 46 and responsive to the leading edge of early pickoff signal 232 to reset flip-flop 46. This results in flip-flop 46 producing the desired separation gate signal 228.

In FIGS. 4A and 4B a complete electrical diagram of the data separation circuit is presented. FIG. 4C shows how FIGS. 4A and 4B fit together to form the circuit of the invention. "Retriggerable one-shot" oscillator 10 produces variable clock pulses 202 on line 51. An inverted clock pulse signal is transmitted on line 52. The three inverter gates 53 in series are responsive to the inverted clock pulses to produce a pulse of reasonable width that is fed back to oscillator 10 to retrigger it. Each of the three gates 53 is one-fourth of Texas Instrument's integrated circuit SN7400 N. The preferred embodiment for the "retriggerable one-shot" oscillator 10 is Fairchild's integrated circuit 9601.

Line 51 is connected to the clock pin of flip-flop 16 and the clock pulses transmitted on line 51 will trigger flip-flop 16 if and only if state indicating signal (C) has been received at the data pin. The output of flip-flop 16 is state indicating signal (A) and the inverted signal $(\bar{A})$. Flip-flop 23 produces state indicating signal (C) and the inverted signal $(\bar{C})$ when triggered by the signal on line 54 provided the inverted state indicating signal $(\bar{A})$ has been received at its data pin.

The signal transmitted on line 54 depends upon the frequency mode selected. The full frequency mode is selected by connecting line 56 to a 3-volt input and the one-half frequency mode is selected by connecting line 56 to ground at terminal 60. Line 56 is connected to AND-gate 29, NAND-gates gates 41 and 42, and negated input OR gate 57. When the full frequency mode is selected, AND gate 29 is enabled and the signal transmitted on line 58 is transmitted to NOR gate 28 on line 59. Since both of the positive voltage inputs to negated input OR gate 57 are inverted, gate 57 will not produce an output on line 61. Consequently, AND-gate 26 will not be enabled and will not transmit a signal on line 62.

When in the one-half frequency mode, the ground potential input on line 56 will be inverted by negated input OR-gate 57 and the resulting positive signal will be transmitted on line 61. Since a negative potential signal will be transmitted on line 56, AND-gate 29 and NAND-gates gates 41 and 42 will not be enabled.

When in the one-half frequency mode AND gate 26 is enabled and will transmit on line 62 the inverted variable clock pulse signal that is received by AND gate 26 on line 52. Since any signal received by NOR gate 28 will be inverted before transmission, the signal supplied on line 54 is the variable clock pulse. When flip-flops 16 and 23 are both triggered by the same variable clock pulse, the two flip-flops react as a divide-by-four shift counter. As previously explained, when flip-flops 16 and 23 react as a divide-by-four shift counter, the two signals produced have a frequency rate which is one-fourth of the triggering variable clock pulse frequency rate, and the two signals are 90° out of phase with each other.

When in the full frequency mode AND gate 29 is enabled and will transmit on line 59 the signal transmitted by line 58. Line 58 is connected to pickoff comparator 31 which produces output signal 212 on line 58 when the sawtooth wave on line 79 passes through the midrange of the sawtooth level. Consequently, NOR gate 28 will produce an output signal on line 54 consisting of an inversion of output signal 212 from pickoff comparator 31. When flip-flops 16 and 23 are triggered by different signals, the two flip-flops perform as a divide-by-two shift counter. When flip-flops 16 and 23 perform as a divide-by-two shift counter, the two output signals have a frequency rate which is one-half the frequency rate of the input variable clock pulses and the two output signals are 90° out of phase with each other. The preferred embodiment for AND gates 26 and 29 and NOR gate 28 is Texas Instrument's AND-OR-Invert gate SN7450 N.

The separated clock pulse is transmitted from terminal 65 on line 66 to flip-flop 22, and drives flip-flop 22 to produce state indicating output signal (B) and the inverted signal $(\bar{B})$. The preferred embodiment for flip-flops 16, 22 and 23 is Texas Instrument's SN7474 N.

State indicating signals (A), (B) and (C) and the inverted signals $(\bar{A})$, $(\bar{B})$ and $(\bar{C})$ are transmitted as inputs to phase comparator 33. The phase comparator comprises NAND-gates 91, 92, 93, 94, negated input OR gate 96 and diodes 97, 98 and 99, all connected as shown in FIG. 4B. The preferred embodiment for the phase comparator is Texas Instrument's SN74H10bN for the gates and Fairchild 1N 914 for the diodes.

When NAND-gate 91 receives all three input signals the output signal is inverted and transmitted to negated input OR gate 96, while NAND gate 92 inverts its output signal after receiving all three input signals and transmits that output signal to negated input OR gate 96. The resulting signal from OR gate 96 is positive and can be represented by the logical expression $(A{\cdot}\bar{B}{\cdot}C) \vee (\bar{A}{\cdot}B{\cdot}\bar{C})$. Since the signal is positive it will pass through diode 97 and by means of the bias circuit, explained below, the positive pulse signal is transmitted on line 67. NAND gate 93 inverts its output signal, which is produced when all three input signals are present and NAND gate 94 inverts its output signal, which is produced when all of its three input signals are present. Since the resulting output signals of NAND gates 93 and 94 are negative, the signals will be transmitted through diodes 98 and 99, respectively, and the resulting negative current signal will be transmitted, due to the circuit biasing, on line 67. This negative signal can be represented by the logical expression $(\bar{A}{\cdot}B{\cdot}C) \vee (A{\cdot}\bar{B}{\cdot}\bar{C})$.

Line 67 is connected to a 180-ohm resistor 184, a lead network 71, a 0.01 microfarad capacitor 101, and bias circuit 72. Leak network 71 comprises a 680-picofarad capacitor 102 and a 2.2-kilohm resistor 103; and the bias circuit comprises a 120-ohm resistor 104 and a 360-ohm resistor 106 in series, and a 2.2-kilohm resistor 107. The combination of current limiting 180-ohm resistor 184 and 0.01-microfarad capacitor 101 performs the function of a low-pass filter and converts the phase comparator output into a stable DC signal which is transmitted through the lead network to line 70 to controlled current source 14. Lead network 71 is required for feedback loop stability.

Line 73 connects current source 14 in series with oscillator 10 and two capacitors in parallel. Capacitor 74 is a 30-picofarad capacitor and capacitor 76 is a 4.5 to 20-picofarad adjustable capacitor and is used to adjust the center frequency of retriggerable one-shot oscillator 10. The preferred embodiment for current source 14 is a transistor 2 N 3906.

Sawtooth wave 200 produced by oscillator 10 is transmitted on line 77 to emitter follower 78, which transforms the impedance level of the charging waveform suitable for use by the comparator circuits. The preferred embodiment for the emitter follower is Fairchild 2N3904. Pickoff comparators 31, 43 and 44 are connected to line 79 in parallel and receive the transformed sawtooth signal 200 after passage through the 510-ohm resistors 108, 109 and 111. The preferred embodiment for the pickoff comparators is Fairchild 710 C.

Potentiometer 112 is connected to pickoff comparator 31 and 1-kilohm resistor 116, potentiometer 113 is connected to pickoff comparator 43 and 1-kilohm resistor 117, and potentiometer 114 is connected to pickoff comparator 44 and 1-kilohm resistor 118. Using the potentiometers individually, each comparator is preset to produce a signal when the sawtooth pulse attains the particular value that has been preselected for that particular comparator. Pickoff comparator 31 is able to produce signal 212 on line 58 when the sawtooth wave passes through and remains above the midpoint of the rising sawtooth level by setting potentiometer 112. Pickoff comparator 43 is able to produce signal 230 on line 81 when the sawtooth signal attains and remains above a value near the late stages of the rising sawtooth level by setting potentiometer 113 while comparator 44 is able to produce signal 232 on line 82 during the sawtooth wave that exceeds a value in the early phase of the rising sawtooth level by setting potentiometer 114. Line 58 connects pickoff comparator 31 to NAND-gate 47, line 81 connects pickoff comparator 43 to NAND gate 41 and line 82 connects pickoff comparator 44 to NAND gate 42.

During the full frequency mode NAND gates 41 and 42 will be enabled, and NAND gate 47 will not be enabled. NAND gate 41 inverts late pickoff signal 230 from pickoff comparator 43 and transmits its output signal on line 83 to network 85. NAND gate 42 inverts early pickoff signal 232 from pickoff comparator 44 and transmits its output signal on line 84 to network 85.

Network 85 comprises two 1-kilohm resistors 116 and 117, two 1.5-kilohm resistors 118 and 119, two 50-picofarad capacitors 121 and 122, two 150-ohms resistors 123 and 124, and two diodes 126 and 127 (preferable Fairchild IN914), and performs the function of a differentiator. Line 83 transmits one output of network 85 to flip-flop 46 and line 84 transmits the other output of network 85 to flip-flop 46. After passage through differentiator network 85 the signal transmitted on line 83 will set flip-flop 46, and the signal transmitted on line 84 will reset flip-flop 46. Since NAND gate 47 is not enable, no signal will be transmitted on line 86, and consequently flip-flop 46 will not receive a triggering input signal at its clock pin. In this frequency mode, flip-flop 46 performs as a set-reset flip-flop, and the output signal transmitted on line 87 is the desired proportional separation gate signal and the inverse of that signal is transmitted on line 88.

When in the half frequency mode NAND gate 47 will be enabled and NAND gates 41 and 42 will not be enabled. NAND gate 47 inverts the signal received from pickoff comparator 31 and transmits its output signal on line 86 to trigger flip-flop 46. No signal is transmitted on line 83 or line 84 during the one-half frequency mode.

In the one-half frequency mode flip-flop 46 will be triggered by the signal transmitted on line 86 and produce the desired proportional separation gate signal on line 87 and the inverted signal on line 88 if and only if a signal has been transmitted on line 91 to its data pin. State indicating signals (A) and (C) and inverted signals ($\bar{A}$) and ($\bar{C}$) are transmitted as input signals to logic network 92, comprising two AND gates and one NOR gate, connected as shown, to produce an output signal in accordance with the logical equation $(A\cdot\bar{C}) \vee (\bar{A}\cdot C)$. This signal is transmitted as the output of logic network 92 and is transmitted on line 91 to the data pin of delay flip-flop 46. The preferred embodiment for logic network 92 is Texas Instrument's AND-OR-Invert gate SN7450N. When flip-flop 46 has received the signal produced by logic network 92, flip-flop 46 is triggered by the input signal transmitted on line 86. The resulting output signal is the desired proportional separation gate signal and is transmitted on line 87 with the inverted signal transmitted on line 88 to terminals 89 and 90, respectively.

Proper circuit operation is achieved by connecting the circuit to the required driving potential. Terminal 151 is connected to a +10-volt supply, terminal 152 is connected to a +5-volt supply, terminal 156 is connected to a −15-volt supply, and terminal 153 is connected to ground. Terminal 154 is used as a −15- and +10-volt-return line. The +10-volt supply is carried on line 157 and is used as the driving potential for the three pickoff comparators. Proper operation requires that line 157 be connected to two 12-ohm resistors 158 and 159, and two 10-microfarad capacitors 161 and 163, 5-volt zener diode 163 and 620-ohm resistor 164 connected to −15 volts as shown in FIG. 4.

The +5-volt supply potential is transmitted on line 166 and is used in conjunction with 12-ohm resistor 167, 330-ohm resistor 168, 750-ohm resistor 169, 2.7-kilohm resistor 171, 0.33-microfarad capacitor 172, 0.1-microfarad capacitor 173, 15-kilohm resistor 174, and three 560-ohm resistors 176, 177 and 178, all connected as shown in FIGS. 4A and 4B. Terminal 181 (FIG. 4B) is connected to 51-kilohm resistor 183 and, along with terminal 182, is used as a test point.

It will thus be seen that the objects set forth above, among those made apparent from the preceding description, are efficiently attained, and certain changes may be made to the above construction without departing from the scope of the invention. It is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Pat. is:

1. Apparatus for generating a separation gate signal for separating data and clock signals from a combined signal subject to timing errors comprising:
   - A. an oscillator
     - a. producing a sawtooth signal and
     - b. producing a second pulse signal,
       - 1. said first and second signals being synchronized and occurring at a controllable frequency rate, and said oscillator being
     - c. responsive to an input signal to control said frequency rate;
   - B. first means
     - a. responsive to said sawtooth signal attaining a first predetermined value to initiate the separation gate signal; and
     - b. responsive to said sawtooth signal attaining a second predetermined value to terminate the separation gate signal; and
   - C. second means
     - a. for comparing the frequency rate of said oscillator with the frequency rate of the clock signals; and
     - b. for producing said input signal.

2. Apparatus as defined in claim 1 wherein said first means comprises:
   - c. a first and second comparator circuit and a separation gate flip-flop circuit,
     - 1. said first comparator circuit adapted to set and said second comparator circuit adapted to reset said separation gate flip-flop.

3. Apparatus as defined in claim 1 wherein said second means comprises:
   - c. a first flip-flop responsive to said second pulse signal to set its state to produce a state indicating output signal (A),
   - d. a second flip-flop adapted to respond to the separated clock signal to change its state and producing a state indicating output signal (B),
   - e. a comparator circuit responsive to said sawtooth signal attaining a predetermined value to produce an output signal,
   - f. a third flip-flop responsive to said comparator circuit output signal to set its state to produce a state indicating output signal (C), if said first flip-flop is in state (A) and produce a state indicating output signal ($\bar{C}$) if said first flip-flop is in state ($\bar{A}$),
   - g. logic means responsive to signals (A), (B) and (C) to produce a first output signal of a first polarity when the logical expression $(A\cdot\bar{B}\cdot C) \vee (\bar{A}\cdot B\cdot\bar{C})$ is true and second output signal of a second polarity when the logical expression $(\bar{A}\cdot B\cdot C) \vee (A\cdot\bar{B}\cdot\bar{C})$ is true.

4. Apparatus as defined in claim 3, further defined in that said input signal to said oscillator is an electrical current and said second means further comprises:

h. a controlled-current source connected to supply said oscillator input signal, and
i. a low-pass filter through which said logic means output signal is supplied to said controlled-current source.

5. Apparatus as defined in claim 3, wherein:
1. said first flip-flop is responsive to said second pulse signal to set its state to produce a state indicating output signal (A) if said third flip-flop is in state (C) and produce a state indicating output signal ($\bar{A}$) if said third flip-flop is in state ($\bar{C}$).

6. Apparatus as defined in claim 3 wherein said logic means is:
1. responsive to the leading edge of signal (B) to initiate said output signal and responsive to the leading edge of signal (A) to terminate said output signal, and further responsive to the trailing edge of signal (B) to initiate said output signal and responsive to the trailing edge of signal (A) to terminate said output signal, when signal (B) is leading signal (A), or
2. responsive to the leading edge of signal (A) to initiate said output signal in the opposite polarity and responsive to the leading edge of signal (B) to terminate said output signal, and further responsive to the trailing edge of signal (A) to initiate said output signal in the opposite polarity and responsive to the trailing edge of signal (B) to terminate said output signal, when signal (B) is trailing signal (A).

7. Apparatus for generating a separation gate signal for separating data and clock signals from a combined signal subject to timing error comprising:

A. an oscillator
 a. producing a first sawtooth signal, and
 b. producing a second pulse signal,
  1. said first and second signals being synchronized and occurring at a controllable frequency rate, and said oscillator being
 c. responsive to an input signal to control said frequency rate;

B. a flip-flop circuit comprising:
 a. a clock input and a data input responsive to existence of a data signal and clock signal to set its state,
 b. to produce a state indicating output separation gate signal, C. first means responsive to said sawtooth signal attaining a predetermined value to produce said clock signal, D. first logic means responsive to said second pulse signal to produce a data signal to said flip-flop during a portion of every other cycle of said sawtooth waveform, and E. second means
 a. for comparing the frequency rates of said oscillator with the frequency rate of the clock signals, and
 b. for producing said input signal.

8. Apparatus as defined in claim 7, wherein said first means comprises a comparator circuit to produce said clock signal when said sawtooth signal attains a predetermined value.

9. Apparatus as defined in claim 7, wherein said second means comprises:
a. a first flip-flop responsive to said second pulse signal to set its state to produce a state indicating output signal (A),
b. a second flip-flop adapted to respond to the separated clock signal to change its state and produce a state indicating output signal (B),
c. logic control means responsive to said pulse signal to produce an output signal,
d. a third flip-flop responsive to said logic control means output signal to set its state to produce a state indicating output signal (C) if said first flip-flop is in state (A) and produce a state indicating output signal ($\bar{C}$) if said first flip-flop is in state ($\bar{A}$).
e. logic means responsive to signals (A), (B) and (C) to produce a first output signal of a first polarity when the logic expression $(A\cdot\bar{B}\cdot C) \vee (\bar{A}\cdot B\cdot\bar{C})$ is true and a second output signal of a second polarity when the logical expression $(\bar{A}\cdot B\cdot C) \vee (A\cdot\bar{B}\cdot\bar{C})$ is true.

10. Apparatus as defined in claim 7, wherein said first logic means is further defined as being responsive to signals (A) and (C) to produce an output signal defined by the logic equation $(A\cdot\bar{C}) \vee (\bar{A}\cdot C)$ which is supplied to said data terminal of said flip-flop circuit.

11. Apparatus as defined in claim 9, wherein said second means is further defined in that said input signal is an electrical current and said second means further comprises:
f. a controlled-current source connected to supply said oscillator input signal, and
g. a low-pass filter through which said logical means output signal is supplied to control said controlled-current source.

12. Apparatus as defined in claim 9, wherein said second means is further defined in that said first flip-flop is responsive to said second pulse signal to set its state to produce a state indicating output signal (A) if said third flip-flop is in state (C) and produce a state indicating output signal ($\bar{A}$) if said third flip-flop is in state ($\bar{C}$).

13. Apparatus as defined in claim 9, wherein said logic means is further defined as being;
1. responsive to the leading edge of signal (B) to initiate said output signal and responsive to the leading edge of signal (A) to terminate said output signal, and further responsive to the trailing edge of signal (B) to initiate said output signal and responsive to the trailing edge of signal (A) to terminate said output signal, when signal (B) is leading signal (A), or
2. responsive to the leading edge of signal (A) to initiate said output signal in the opposite polarity and responsive to the leading edge of signal (B) to terminate said output signal, and further responsive to the trailing edge of signal (A) to initiate said output signal in the opposite polarity and responsive to the trailing edge of signal (B) to terminate said output signal, when signal (B) is trailing signal (A).

14. Apparatus for generating a separation gate signal for separating data and clock signals from a combined signal subject to timing errors comprising:

A. an oscillator
 a. producing a first sawtooth signal, and
 b. producing a second pulse signal,
  1. said first and second signals being synchronized and occurring at a controllable frequency rate, and said oscillator being
 c. responsive to an input signal to control said frequency rate;

B. first comparator means responsive to said sawtooth signal attaining a predetermined value to produce a set signal;

C. second comparator means responsive to said sawtooth signal attaining a second predetermined value to produce a reset signal;

D. third comparator means responsive to said sawtooth signal attaining a third predetermined value to produce a flip-flop controlling clock signal;

E. a flip-flop comprising
 a. set, reset, data and clock terminals,
 b. said flip-flop responsive to said set signal to initiate the separation gate signal and responsive to said reset signal to terminate the separation gate signal,
 c. said flip-flop being further responsive to said clock signal when receiving a data signal to set its state and thereby initiate or terminate the separation gate signal in accordance with the state of the data signal, F. logic control means responsive to said set and reset signals and responsive to said clock signal, to supply either said set-reset signals or said clock signal to said Flip-flop but not both;

G. means
 a. responsive to said second pulse signal to supply said data signal to said flip-flop during every other cycle of said oscillator;
 b. for comparing the frequency rate of said oscillator with the frequency rate of the recorded clock signals, and c. for producing said input signal which is a function of the existing timing error.

15. Apparatus as defined in claim 14 wherein said last means further comprises:

d. a first flip-flop responsive to said second pulse signal to set its state to produce a state indicating output signal (A), e. a second flip-flop adapted to respond to the separated clock signal to change its state and produce a state indicating output signal (B), f. logic control means responsive to said third comparator circuit depending upon the frequency mode selected responsive to said second pulse signal to produce an output signal, g. a third flip-flop responsive to said third comparator circuit output signal to set its state to produce a state indicating output signal (C) if said first flip-flop is in state (A) and produce a state indicating output signal ($\overline{C}$) if said first flip-flop is in state ($\overline{A}$).

h. logic means responsive to signals (A), (B) and (C) to produce a first output signal of a first polarity when the logical expression $(A \cdot \overline{B} \cdot C) \vee (\overline{A} \cdot B \cdot \overline{C})$ is true and a second output signal of a second polarity when the logical expression $(\overline{A} \cdot B \cdot C) \vee (A \cdot \overline{B} \cdot \overline{C})$ is true.

UNITED STATES PATENT OFFICE
CERTIFICATE OF CORRECTION

Patent No. 3,609,560 Dated September 28, 1971

Inventor(s) Michael P. Greenberg

It is certified that error appears in the above-identified patent and that said Letters Patent are hereby corrected as shown below:

Column 2, Line 11, "osciallator's" should be --oscillators--
Column 3, Line 65, "(b)" should be --(B)--
Column 4, Line 1, after "v" insert a parenthesis mark --(--
Column 4, Line 4, delete "pickoff" second occurrence
Column 4, Line 14, "(A)" should be --(C)--
Column 5, Line 42, after "NAND" delete "gates" first occurrence
Column 5, Line 55, after "NAND" delete "gates" first occurrence
Column 6, Line 21, "SN74H10bN" should be --SN74H10N--
Column 6, Line 43, "Leak" should be --Lead--
Column 7, Line 25, "preferable" should be --preferably--
Column 7, Line 31, "enable" should be --enabled--

Signed and sealed this 2nd day of May 1972.

(SEAL)
Attest:

EDWARD M.FLETCHER, JR.
Attesting Officer

ROBERT GOTTSCHALK
Commissioner of Patents